United States Patent [19]

Seemann

[11] 4,380,994
[45] Apr. 26, 1983

[54] ALL SEASON WINDOW

[76] Inventor: Robert A. Seemann, 89 Earl Ave., Hamden, Conn. 06514

[21] Appl. No.: 377,663

[22] Filed: May 12, 1982

Related U.S. Application Data

[62] Division of Ser. No. 52,770, Jun. 28, 1979, Pat. No. 4,347,835.

[51] Int. Cl.$^3$ .......................... F24J 3/02; E06B 7/12; E06B 7/14
[52] U.S. Cl. .................... 126/431; 126/432; 126/DIG. 1; 52/171; 52/788; 160/44
[58] Field of Search ............... 126/900, 431, 428, 450, 126/419, 449, DIG. 1; 52/171, 788, 173; 98/100; 47/17; 160/44

[56] References Cited

U.S. PATENT DOCUMENTS

| | | | |
|---|---|---|---|
| 3,981,294 | 9/1976 | Deminet | 126/443 |
| 4,093,352 | 6/1978 | Pisar | 52/171 |
| 4,183,350 | 1/1980 | Staudacher | 126/431 |
| 4,215,672 | 8/1980 | Chiapale | 126/431 |
| 4,236,360 | 12/1980 | Parrier | 52/171 |
| 4,286,576 | 9/1981 | McClelland | 126/449 |
| 4,290,416 | 9/1981 | Maloney | 126/431 |
| 4,347,835 | 9/1982 | Seemann | 126/431 |

FOREIGN PATENT DOCUMENTS 2826937 1/1980 Fed. Rep. of Germany ...... 126/431

Primary Examiner—Samuel Scott
Assistant Examiner—G. Anderson
Attorney, Agent, or Firm—Robert A. Seemann

[57] ABSTRACT

An all season window includes a rectilinear peripherally extending pane mounting frame. Three panes of transparent material are secured sealingly within the frame in parallel spaced relationship and extend vertically. A solar heat ray absorbent material is contained within the frame. In one preferred form of the invention the middle of the three panes comprises the solar heat ray absorbent material and a discrete amount of heat absorbent liquid is included within the frame. A pump and associated motor is provided for pumping the heat absorbent liquid between a first location in which it fills the region between the outer and intermediate panes and a second location in which the liquid fills the region between the inner and intermediate panes. In its described first location solar heat rays are absorbed by the middle pane and a dead air space between the liquid and the closed environment sought to be provided with climatic control inhibits conduction of heat to such closed environment while the liquid conducts heat received from the middle pane through the outer pane to the outside environment. Such an arrangement of the heat ray absorbent liquid within the pane mounting frame is desirable during summer months. During winter months when it is desirable to minimize a loss of heat from the closed environment the heat ray absorbent liquid is moved to the region between the inner pane and the intermediate pane.

4 Claims, 2 Drawing Figures

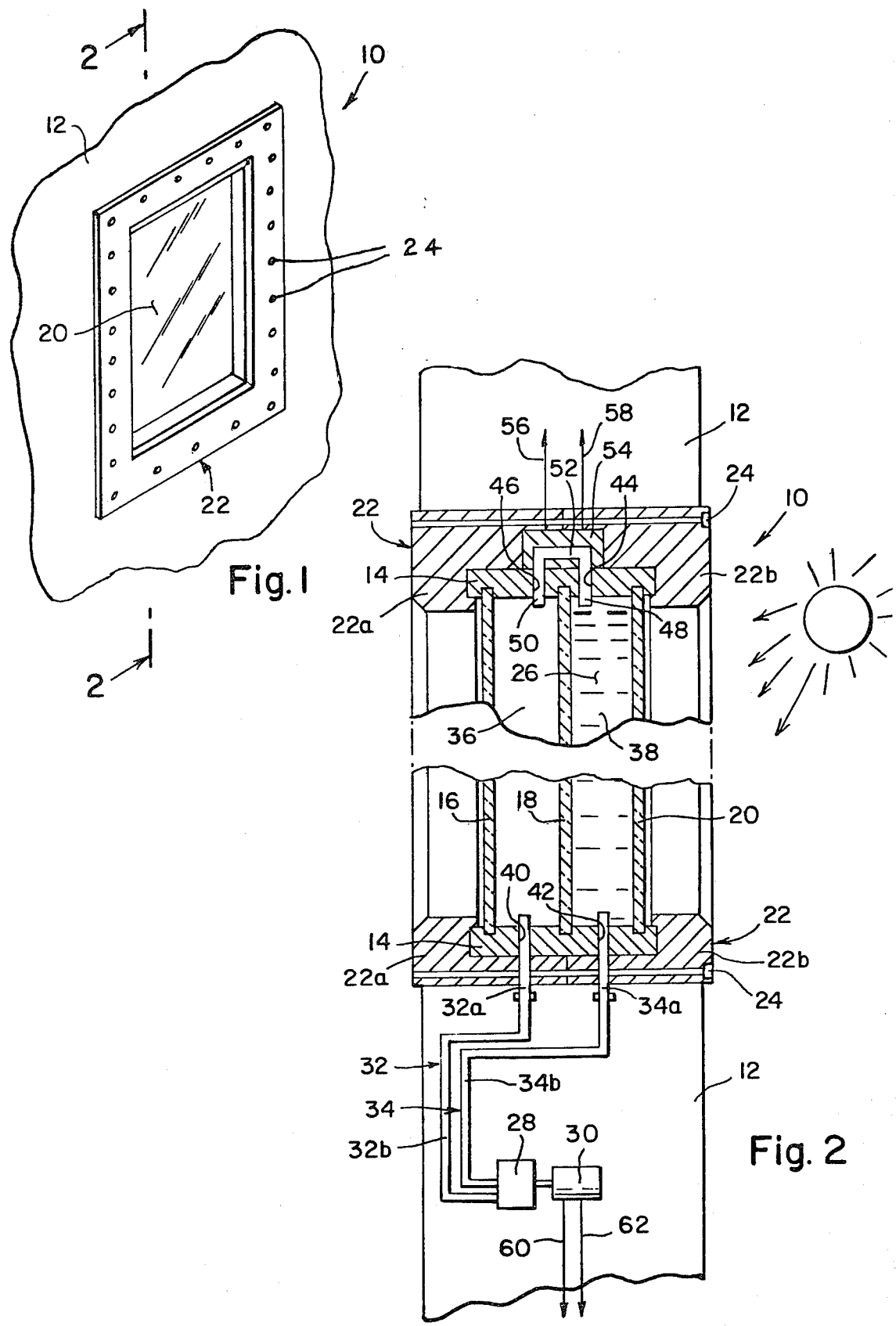

ALL SEASON WINDOW

CROSS-REFERENCE TO RELATED APPLICATION

This is a divisional application of Ser. No. 052,770 filed June 28, 1979, now U.S. Pat. No. 4,347,835.

BACKGROUND OF THE INVENTION

The present invention relates to solar energy systems and more particularly to an all season window construction whereby loss of heat from an interior closed environment to the outside is minimized during cold weather and transmission of heat from the outside to the interior closed environment is minimized during seasons when the outside temperature is relatively high.

There has for some time heretofore been a recognition of the need to control the transfer of solar energy from the outside environment to a closed environment during the warm weather months and to prevent the transfer of heat from the closed environment to the outside during the cold weather months while concomitantly retaining a clear unobstructed view through the window arrangement employed to effectuate such control. Accordingly, a variety of window constructions have been proposed and have been known prior to the present invention. Such earlier constructions, however, have failed to provide the optimum control sought, have required unduly complex structural arrangements or have interfered with the clear visibility expected of window constructions. U.S. Pat. No. 2,918,709 issued Dec. 29, 1959 to L. J. Corcoran, for example, discloses a window unit which incorporates therein a heat radiating section and a dead air space. The unit is given trunnions so that it can be mounted pivotably in a window frame for reversal as desired according to the season. Alternately, since the relative location of the heat radiating and dead air sections is fixed, the unit can be mounted in the window frame and manually removed therefrom for reversal to meet the seasonal requirements. Such a unit poses the problem of selecting a time for reversal when indoor and outside temperature and humidity are substantially the same in order to avoid heat or air conditioning loss from the closed environment and the entry of rain during inclement weather. Further, in the case of the pivotal mounting of the unit in the window frame problems are apt to arise in connection with the sealing of the unit in the window frame. With the advent of energy shortages throughout the world the demand for more effective control of heat transfer through window constructions, especially via the utilization of solar energy, has become extremely important and in fact crucial.

SUMMARY OF THE INVENTION

It is one object of the invention to provide an all season window which affords effective control of solar energy during all seasons of the year while preserving unobstructed image transmission therethrough.

It is another object of the invention to provide a window construction permitting effective heat transfer control therethrough during warm and cold weather seasons without requiring relocation of the window in accordance with the changes in season.

It is another object of the invention to provide an all season window construction which can be readily integrated with the automatic environmental control system of an enclosed environment such as a room or other interior region of a building.

It is still another object of the invention to provide greater choice of liquid which is maintained in the locations of the window construction in the manner of the invention than is provided by the construction described in my application of Ser. No. 052,770.

Other objects and advantages of the invention will become readily apparent to persons versed in the art from the ensuing description thereof.

In accordance with the invention there is provided an all season window comprising a peripherally extending pane mounting frame; first, second and third panes of transparent sheet material mounted sealingly within the frame in spaced parallel relationship each to the other. The second pane is interposed between the first and third panes and comprises a solar heat ray absorbent material. A heat absorbent liquid is contained within the frame so as to be movable selectively between a first location within the region between the first and second panes at which location it occupies substantially the entire area of one side of the second pane and a second location within the region between the second and third panes at which second location it occupies substantially the entire area of the other side of the second pane. A pump and associated motor enable selective movement of the heat absorbent liquid between the first and second locations.

BRIEF DESCRIPTION OF THE DRAWINGS

In order that the invention may be more fully comprehended it will now be described, by way of example, with reference to the accompanying drawings, in which:

FIG. 1 is a perspective view of a window embodying the features of the invention;

FIG. 2 is a side elevational view, in cross-section, of the window shown in FIG. 1 taken along line 2—2 thereof.

DESCRIPTION OF THE PREFERRED EMBODIMENT

Before explaining the invention in detail it is to be understood that the invention is not limited in its application to the details of construction and arrangement of parts illustrated in the drawings since the invention is capable of other embodiments and of being practiced or carried out in various ways. It is also to be understood that the phraseology or terminology employed is for the purpose of description only and not of limitation.

Referring to the drawings, in which like parts are similarly designated, there is shown a window 10 installed within an exterior wall 12 of a building or other structure. The window is permanently positioned within such wall in conventional manner and may be provided with a caulked joint as is customary. The window includes a sash or pane mounting frame 14 which extends peripherally to completely enclose the panes set therein. Generally such frame 14 is given a rectilinear configuration; however, it will be appreciated that the specific shape may be determined in accordance with the architectural design of the building and the provision made therein for the windows.

Positioned within frame 14 and sealed with respect thereto are a series of three panes of transparent sheet material 16, 18 and 20. The panes may be made of glass or of a clear transparent plastics material as desired. One or more of the panes may be tinted but not so much as to interfere with the transmission of sharp images through the window or to excessively reduce the solar heat control benefit of the window. It will be noted that pane 16 is mounted within the frame 14 as the innermost pane, pane 20 is mounted as the outermost pane and is the pane which is exposed to the outside environment. The third pane 18 is mounted so as to be intermediate the other two panes and comprises a solar heat ray absorbent material. All of such panes are set vertically within the frame 14 in spaced parallel relationship. The sealing of panes 16, 18 and 20 within frame 14 should be fluid tight.

Referring particularly to FIG. 2 it will be observed that a second frame 22 peripherally encloses pane mounting frame 14. Frame 22 consists of a pair of peripherally extending sections 22a, 22b which are releasably connectable such as by means of a bolt 24 which is of sufficient length to extend through the sections of the frame. A plurality of such bolts may be provided in spaced relation throughout the peripheral extent of the frame sections, the spacing to be selected in accordance with the specific window design, size of the bolts, etc. The use of bolts are contrasted with nails or other fastening means is preferred because of the enhanced capability of separation of sections 22a and 22b. although it is contemplated that the window, once assembled and installed in enclosure wall 12, will be a permanent installation it is desirable that provision be made for disassembly in an expeditious manner in the event that there is need for replacement of any of the components thereof.

As can be seen most clearly in FIG. 2, a liquid 26 is introduced into the region of the window between the outermost and intermediate panes 20, 18. The level of liquid should be such that substantially the entire exposed area of pane 18 is covered. The liquid should not affect image sharpness and therefore should be selected so it will not wet the panes in a manner which leaves streaking or adhered droplets behind on the panes of one region when the liquid is moved to an alternate region as described hereinafter. Accordingly, the liquid should be selected from those liquids which will not wet the panes when in contact therewith and it is also within the contemplation of the invention and the art to include a "wetting agent" in the liquid to minimize adhered droplets and streaking which would prevent sharp unobstructed view through the panes. If desired, also the liquid may be capable of absorbing solar heat rays. Persons versed in the art of solar radiation apparatus will readily be able to select an appropriate liquid. Preferably the liquid should be clear or colorless so as not to interfere with the transmission of sharp images through the window. However, if desired, a minor amount of a coloring agent may be added to afford tinting.

Although it was suggested previously that the liquid be introduced between the outermost and intermediate panes it will be recognized that the location of the liquid in such position is recommended for warm weather seasons at which times the heat produced in middle pane 18 as a result of solar radiation will be transferred by conduction through the liquid 26 to outer pane 20 and thence dissipated to the outside by conduction and/or convection. The region between the intermediate and inner panes 18, 16 at such times will serve in the nature of a dead air space to minimize any conduction of heat to the closed environment thereby enabling the maintenance of desired climatic conditions within such environment. On the other hand, during periods of cold weather the liquid is introduced between the panes 16, 18. At such times solar rays passing through pane 20 and through pane 18 will produce heat within the solar heat ray absorbent material, raising the temperature of pane 18 and the adjoining liquid. The heat in the liquid will be transferred by conduction through pane 16 to the closed environment thereby contributing to the heating of such environment and reducing the heating requirements for maintenance of a predetermined temperature therein. The region between panes 18, 20 at such times serves in the nature of a dead air space and inhibits the transfer of heat to the outside environment.

In order to allow for the transfer of the heat absorbent liquid back and forth between the respective regions between the intermediate and outer panes 18, 20 and the intermediate and inner panes 18, 16 in accordance with seasonal demands there is provided a pump 28 and a motor 30 coupled drivably therewith. The motor is desirably electric and reversible for reasons which will become clear. A first set of liquid transfer tubes or conduits 32, 34 communicate respectively with the regions 36, 38 between the intermediate and inner panes 18,16 and between the intermediate and outer panes 18, 20 in the lower portion of the frame 14. Such tubes or conduits 32, 34 also communicate at their opposite ends with the pump 28. It is presently preferred that each of tubes or conduits 32, 34 include relatively rigid segments 32a, 34a and flexible segments 32b, 34b. This arrangement permits the pump 28, motor 30 and tube segments 32b, 34b to be treated as a unitary motorized pump package and facilitates installation of such a package such as by connection of the flexible tubes to the rigid segments through use of detachable clamp-like fittings. The tube segments 32a, 34a are set within appropriate apertures 40, 42 formed in frame 14 and project slightly into the regions between the panes.

At the upper portion of frame 14 there are formed apertures 44, 46 to accomodate a second set of liquid transfer tubes or conduits 48, 50. Desirably the upper extremities of tubes 48, 50 are interconnected by an overflow by-pass tube 52. A limit switch 54 is positioned within a suitable space provided therefor in frame 22, the limit switch having sensors (not shown) operably associated with either the interior of tubes 48, 50 or regions 36, 38 so that when liquid rises within the region being employed depending upon the particular season (within region 36 or 38) to a predetermined level the limit switch, connected electrically by means of wires 56, 58 to motor 30, acts to deactivate the motor and pump. Liquid is thus prevented from being pumped into the region to be reserved as the dead air space as described above. Limit switches of the type presently available commercially are effective in achieving the desired level control of the liquid and will be known to the skilled mechanic so that a detailed description of switches is not necessary and will only encumber the present specification. The limit switch will not permit reactivation of the motor unless the level of liquid recedes to a point below the predetermined level or until the voltage for the motor is reversed so as to transfer the liquid to the other region between the panes previously reserved as the dead air space. Motor 30 is provided with conductors 60, 62 to supply power thereto from an external electric power supply. It will be understood, of course, that switching may be also provided which interconnects the motor with an automatic environmental control system utilized in conjunction with the maintenance of predetermined climatic conditions within the room or building. It will also be recognized that the provision of the limit switch and its function as an overflow cut-off enables filling of the system with liquid which exceeds the capacity of regions 36, 38 thereby retaining liquid within conduits 32, 34 to keep pump 28 primed. The limit switch incorporates a bypass tube which permits displacement of gas as the liquid 26 enters region 36 or 38 and to provide displacement gas for the unused emptying region and permits liquid flow back thereto in the event of limit switch failure and continued operation of the pump after the region to be employed becomes filled with the liquid. Excessive build-up of hydraulic pressure is thus prevented and protection provided for the components of the window in such instances when the limit switch fails to deactivate the motor and pump under liquid filled conditions.

It has already been stated that one of the advantages of employing flexible tubes 32b and 34b for the transfer of liquid between regions 36, 38 and pump 28 is to facilitate use of a motorized pump package. It should additionally be recognized that since conduits 32, 34 always contain liquid regardless of which region 36, 38 is to be filled, the differential fluid pressure head will be determined by the height of liquid within the filled region. The flexible transfer tubes can, therefore, be made of any length which is convenient for installation of the pump and motor assembly without affecting the head on the pump. The tubes can thus be located below the window as may be desired, the limiting factor being a hydrostatic pressure from the resulting liquid column in the flexible tubes which will not lead to bursting of the tubes or the pump seals.

From the foregoing description of the invention it will be seen that an all season window construction has been provided which will permit optimum transfer of solar radiated heat to an enclosed environment during cold weather periods while concomitantly minimizing the escape of heat from the closed environment to the outside during such periods. The window construction also minimizes the transfer of solar radiated heat to the enclosed environment during warm weather periods and consequently reduces the amount of energy required to maintain predetermined climatic conditions within the closed environment. The window construction of the invention can further be seen as allowing the transmission of sharp unobstructed images therethrough regardless of whether the window is in use during warm or cold weather seasons.

Although the invention has been described in specific terms it will be understood that various changes may be made in size, shape, materials and in the arrangement of the parts without departing from the spirit and scope of the invention as claimed.

Having thus set forth the nature of the invention, what is claimed herein is:

1. An all season window comprising:
   a peripherally extending pane mounting frame mounting said window in an exterior wall of a structure having an interior space;
   first, second and third panes of essentially rigid transparent sheet material mounted sealingly and fixedly within said frame in spaced parallel relationship each to the other, said second pane being interposed between said first and third panes, said second pane comprising solar heat ray absorbent material;
   a discrete amount of heat absorbent liquid maintained either at a first location between said first and second panes to minimize transfer of heat from absorbed solar energy to said interior space or at a second location between said second and third panes to provide said heat to said interior, said discrete amount being sufficient to substantially fill only one of said locations at a time;
   and means for selectively moving said heat absorbent liquid between said first and second locations.

2. A window according to claim 1, including a second frame peripherally enclosing at least the upper and lower portions of said pane mounting frame, said second frame including first and second releasably connectable sections.

3. A window according to claim 2, including through bolt means extendable through said first and second sections for connecting said first and second sections along a plane which extends generally parallel to the said panes.

4. A window according to claim 1, 2 or 3 wherein said means for moving said heat absorbent liquid comprises a pump, motor means, a first conduit connecting said first location to said pump and a second conduit connecting said section location to said pump.

* * * * *